United States Patent Office 3,102,882
Patented Sept. 3, 1963

3,102,882
DERIVATIVES OF 3,4-DIHYDRO-1,2,4-BENZO-THIADIAZINE-1,1-DIOXIDE
James M. McManus, Uncasville, and William M. McLamore, Groton, Conn., assignors to Chas. Pfizer & Co., Inc., New York, N.Y., a corporation of Delaware
No Drawing. Filed Sept. 27, 1960, Ser. No. 58,632
3 Claims. (Cl. 260—243)

This invention is concerned with a new class of highly effective therapeutic agents as well as the method of preparing same. In particular the therapeutic agents of this invention are 6-substituted - 2 - alkyl-3-allylthiomethyl-7-sulfamyl - 3,4 - dihydrobenzo-1,1-dioxo-1-thia - 2,4 - diazines. The compounds, hereinafter referred to as 6-substituted-2-alkyl-3-allylthiomethyl - 7 - sulfamyl-3,4-dihydrobenzothiadiazine dioxides are represented by the following formula:

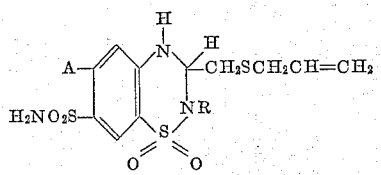

wherein A is selected from the group consisting of hydrogen, Cl, Br, trifluoromethyl and alkyl and alkoxy, each containing 1 to 3 carbon atoms, and R is lower alkyl.

It is also intended to include within the scope of this invention salts of the above class of compounds. Particularly valuable are salts formed with bases containing a pharmacologically acceptable cation.

The 6 - substituted-2-alkyl-3-allylthiomethyl-7-sufamyl-3,4-dihydrobenzothiadiazine dioxides of this invention may be prepared by the reaction of a substituted aniline of the formula:

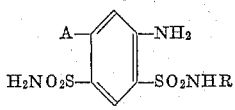

in which A and R are as described above, with an aldehyde of the formula:

$$CH_2=CH-CH_2SCH_2CHO$$

Alternatively, corresponding aldehyde derivatives may be employed in place of the aldehyde, for example, loweralkyl acetals of these aldehydes, which may be generally represented by the formula $CH_2=CHCH_2SCH_2CH(OR_1)_2$ in which $R_1$ is lower alkyl. The reaction is preferably effected by heating a substantially equimolar mixture of the reactants in an inert organic solvent at a temperature of from about 60° C. to about 120° C. Usually, a reaction time of from about ½ to about 5 hours is found to give excellent yields of the desired products. Longer reaction time may be used without appreciable advantage. Slight excess of aldehyde, or derivative, for example up to 10% may be used, but larger excesses should be avoided since their use may lead to reduced yield of the desired product.

By inert organic solvents as employed herein is meant an organic solvent which dissolves the reactants but does not react with same under the reaction conditions described. Such solvents may be readily determined by routine experimentation in the laboratory. Although other solvents may be employed, excellent results are obtained with N,N-dialkylloweralkanoamides, such as dimethylformamide, diethylacetamide, dipropylpropionamide, diethylformamide and the like, as well as alkylated glycols, such as the dimethyl ether of butylene glycol, the dipropyl ether of ethyleneglycol and the like. When the acetals are used in place of the aldehydes, it is generally found helpful, but not essential, to add a minor amount of aqueous mineral acid. Usually only a few drops of aqueous acid, such as hydrochloric, sulfuric, phosphoric and the like, is found sufficient. The addition of acid merely increases the rate of reaction.

After the reaction is complete, the products are obtained by conventional methods, such as concentration and crystallization. The products may then be recrystallized from suitable solvents.

The present new compounds are found to be diuretic agents of high potency. They not only effect an increase in urine excretion but also effect a more favorable electrolyte excretion pattern with increased natriuresis and chloruresis without a commensurate increase in kaliuresis. This electrolyte excretion pattern is highly desirable since, as is generally known in the medical art, the use of many of the more potent diuretic agents generally leads to depletion of potassium in the body which condition is known as hypokalemia. Further, the present new compounds also exhibit a more prolonged duration of action and, therefore, a greater total effect on the basis of maximal rates of saluresis when compared with related known diuretics such as corresponding compounds in which the 2-substituent is hydrogen. For example, 2-methyl-3-allylthiomethyl-6-chloro-7-sulfamyl - 3,4 - dihydro-1,2,4-benzothiadiazine-1,1-dioxide in rats shows greater diuresis, natriuresis and chloruresis and lower kaliuresis than 3-allylthiomethyl - 6 - chloro - 7 - sulfamyl-3,4-dihydrobenzothiadiazine-1,1-dioxide and also exhibits a longer duration of action.

The therapeutic agents of this invention may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example enough saline or glucose to make the solution isotonic.

The physician will determine the dosage of the present therapeutic agents which will be most suitable and it will vary with the form of administration and the particular compound chosen, and furthermore, it will vary with the particular patient under treatment. He will generally wish to initiate treatment with small dosages substantially less than the optimum dose of the compound and increase the dosage by small increments until the optimum effect under the circumstances is reached. It will generally be found that when the composition is administered orally, larger quantities of the active agent will be required to produce the same effect as a smaller quantity given parenterally. The compounds are useful in the same manner as other diuretics and the dosage level is of the same order of magnitude as is generally employed with these other therapeutic agents. The therapeutic dosage will generally be from 1 to 10 milligrams per day and higher although it may be administered in several different dosage units.

Tablets containing from 0.5 to 10 mg. of active agent are particularly useful.

In the foregoing, reference is made to pharmacologically acceptable cations. "Pharmacologically acceptable cations" has a definite meaning to one skilled in the art. It is defined as a non-toxic cation of basic compounds commonly used in pharmacology to neutralize acid medicinal agents when the salt thereof is to be used therapeutically. The pharmacological activity of the molecule is primarily a function of the anion, the cation serving chiefly to supply electrical neutrality. Commonly employed pharmacologically acceptable cations are, for example, sodium potassium, calcium and magnesium. The salts of the compound of the present invention may be prepared employing conventional procedures. One such procedure involves treating the subject compounds with an aqueous solution containing an equivalent amount of the reagent, i.e. the pharmacologically acceptable base, followed by concentration of the resultant mixture to obtain the desired product. Pharmacologically acceptable bases are those which contain the cations described above. Such bases may be for example, oxides, hydroxides, carbonates or bicarbonates. Of course, salts formed with pharmacologically unacceptable bases, while not useful therapeutically, may be used in the purification of the present therapeutic agents and also in the preparation of the pharmacologically acceptable salts.

The starting compounds of the present process, i.e. the 4-amino-2-substituted - 5 - alkylsulfamylbenzenesulfonamides, are prepared according to known procedures, e.g. J.A.C.S. 82, 1132–1135 (1960).

The following examples are given by way of illustration and are not to be construed as limitations of this invention, many variations of which are possible without departing from the scope and spirit thereof.

EXAMPLE I

*2-Methyl-3-Allylthiomethyl-6-Chloro-7-Sulfamyl-3,4-Dihydro-1,2,4-Benzothiadiazine-1,1-Dioxide*

To 6.75 g. (0.0225 mole) of 4-amino-2-chloro-5-(methylsulfamyl)benzenesulfonamide in 45 ml. of dimethylformamide is added 4.86 g. (0.03 mole) of dimethyl allylmercaptoacetal followed by 1.5 ml. of ethyl acetate saturated with hydrogen chloride gas. The solution is refluxed for 1.5 hours, cooled and added dropwise with stirring to ice/water. The resulting precipitate is filtered, dried and recrystallized from isopropanol. Three recrystallizations gave 4.0 g. of product melting at 168.5°–170° C.

EXAMPLE II

*2-Methyl-3-Allylthiomethyl-6-Methyl-7-Sulfamyl-3,4-Dihydro-1,2,4-Benzothiadiazine-1,1-Dioxide*

To a solution of 0.02 mole of 4-amino-2-methyl-5-(methylsulfamyl)benzenesulfonamide in 50 ml. of dimethylformamide is added 0.03 mole of dimethyl allylmercaptoacetal followed by 1.5 ml. of ethyl acetate saturated with hydrogen chloride gas. The solution is refluxed for 2.0 hours, cooled and added dropwise with stirring to ice/water. The resulting precipitate is filtered, dried and recrystallized from isopropanol.

EXAMPLE III

Employing the procedure of Example I the following compounds are prepared from corresponding starting compounds:

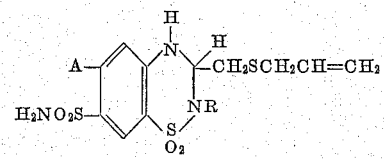

| A | R |
|---|---|
| CF$_3$ | CH$_3$ |
| Br | C$_2$H$_5$ |
| OCH$_3$ | CH$_3$ |
| n-C$_3$H$_7$ | n-C$_3$H$_7$ |
| OC$_3$H$_7$ | i-C$_3$H$_7$ |
| i-C$_3$H$_7$ | CH$_3$ |

EXAMPLE IV

The sodium salt of the Example I product is obtained by dissolving the product in water containing a molar equivalent of sodium hydroxide and then freeze-drying the mixture.

In this manner, the potassium, calcium and magnesium salts are also prepared.

EXAMPLE V

A tablet base is prepared by blending the following ingredients in the proportion by weight indicated:

| | |
|---|---|
| Sucrose, U.S.P. | 82.0 |
| Tapioca starch | 13.6 |
| Magnesium stearate | 4.4 |

Into this base there is blended a sufficient amount of 2-methyl-3-allylthiomethyl - 6 - chloro-7-sulfamyl-3,4-dihydro-1,2,4-benzothiadiazine-1,1-dioxide to provide tablets containing 0.5, 2.5 and 10 mg. respectively of active ingredient.

What is claimed is:

1. A compound selected from the group consisting of compounds of the formula:

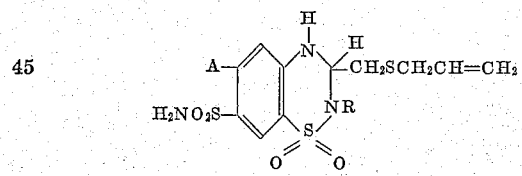

wherein:

A is selected from the group consisting of chloro, bromo, trifluoromethyl and alkyl and alkoxy each containing 1 to 3 carbon atoms;

and R is lower alkyl;

and salts thereof with pharmacologically acceptable bases.

2. 2-methyl-3-allylthiomethyl-6-chloro-7-sulfamyl - 3,4-dihydro-1,2,4-benzothiadiazine-1,1-dioxide.

3. 2-methyl-3-allylthiomethyl-6-methyl-7-sulfamyl - 3,4-dihydro-1,2,4-benzothiadiazine-1,1-dioxide.

References Cited in the file of this patent

Australia, 56,238/60, open to public inspection July 7, 1960.